United States Patent [19]

Nielsen

[11] 4,254,425
[45] Mar. 3, 1981

[54] ELECTRIC DISCHARGE PRINTING DEVICE HAVING A LAMINAR STYLUS

[75] Inventor: Leif Nielsen, Borkerd, Denmark

[73] Assignee: Rex Rotary International Corporation A/S, Denmark

[21] Appl. No.: 921,793

[22] Filed: Jul. 3, 1978

[30] Foreign Application Priority Data

Jul. 6, 1977 [GB] United Kingdom ............... 28411/77
Jul. 6, 1977 [GB] United Kingdom ............... 28412/77

[51] Int. Cl.³ ...................... G01D 15/06; G01D 15/16
[52] U.S. Cl. ............................. 346/162; 346/139 C; 346/155; 358/296
[58] Field of Search ............... 346/139 C, 139 A, 153, 346/155, 162, 163, 165; 358/296

[56] References Cited

U.S. PATENT DOCUMENTS

| | | | |
|---|---|---|---|
| 3,971,042 | 7/1976 | Ring | 346/139 C |
| 4,032,930 | 6/1977 | Tauszig | 346/163 |
| 4,095,236 | 6/1978 | Tauszig | 346/139 C |
| 4,148,042 | 4/1979 | Mutton et al. | 346/139 C |

Primary Examiner—Raymond F. Cardillo, Jr.
Attorney, Agent, or Firm—Fleit & Jacobson

[57] ABSTRACT

An electric discharge printing device has the stylus formed as a conductive lamina with the stylus tip formed as the corner at which two edges of the lamina of the stylus intersect. The lamina is electrically energized to exert the appropriate electric discharge printing action on a copy sheet, such as a duplicating stencil to be cut electrically. The plane of the lamina is perpendicular to the copy sheet but parallel to the direction of relative motion between the stylus tip and the sheet, in use of the device.

12 Claims, 16 Drawing Figures

ELECTRIC DISCHARGE PRINTING DEVICE HAVING A LAMINAR STYLUS

The present invention relates to the printing of facsimiles, in particular by the use of an electric discharge printing system. Such a system may, for example, be used where a facsimile copy is to be generated at a receiving station of an original scanned at a transmitting station, or in apparatus for scanning an original image to generate a facsimile copy in a different medium, for example in electronic discharge cutting of duplicator stencils. Throughout this Specification, the term "electric discharge printing" is intended to denote generically stencil cutting, facsimile transmission and image processing.

Electric discharge printing (as hereinbefore defined) is used in the preparation of duplicating stencils where an original image on a sheet of paper is scanned and a corresponding image is to be formed as ink-permeable areas on an otherwise ink-impervious stencil sheet which can subsequently be used to print numerous copy sheets with the same image. This system has used electric discharge across a gap defined between a conductive rotating drum and a stylus point mounted close to the surface of a stencil carried on the drum. The electric potential applied across the gap between the stylus point and the drum must be at least equal to the breakdown potential of the stencil material so that the ink-impervious medium of the stencil is dispersed locally to leave an ink-pervious support layer exposed locally in the image areas of the stencil. When this stencil is used for printing copies the non-image areas where the ink-impervious stencil medium has been undisturbed will resist the permeation of ink through the stencil, whereas in the image areas the dispersal of the ink-impervious medium leaving exposed ink-pervious regions will allow the ink to pass through and to contact the copy sheets.

Conventionally, thin wire styli are used in such stencil cutting equipment and it is an object of the present invention to provide an alternative form of stylus for use in all forms of electric discharge printing.

Accordingly the present invention provides a stylus for electric discharge printing, comprising a conductive lamina having a corner which, in use, serves as the stylus tip, and means for connecting electrically energising said lamina from a discharge printing device in which the stylus is to be used.

In one particularly convenient form of the invention the lamina may be circular and may be mounted for rotation about an axis parallel to but spaced from the surface of the copy sheet-support drum of electric discharge printing apparatus in which the stylus is to be used, the circular lamina having a peripheral recess which joins the circular periphery of the lamina at the stylus tip arranged to come adjacent the surface of the copy sheet-support drum. With this arrangement the circular lamina is biased for rotation in one direction driving said cutting tip towards the surface of the drum whereby erosion of the cutting tip during spark discharge cutting of the stencil will be automatically compensated for by rotation of the stylus disc.

Alternatively, the lamina may consist of a plate having two edges meeting at an angle at a corner which defines the cutting tip of the stylus. In such an arrangement, the stylus lamina may be integrally formed with a resilient mount which is adapted to be secured in electric discharge printing apparatus to allow the cutting tip to be resiliently supported adjacent the surface of the copy sheet support drum. More preferably, said resilient mount is a generally planar resilient support plate and the stylus lamina is formed as a tab bent over at right angles to said generally planar resilient support plate.

Alternatively, it may be desirable to provide the stylus as a conductive track formed on an insulating carrier.

The invention also provides electric discharge printing apparatus, such as a stencil cutter, equipped with a stylus consisting of a lamina having two edge portions intersecting at a cutting tip. The lamina may be wholly conductive or may be insulating with a conductive track thereon, for example by thin film deposition.

An advantageous embodiment of the present invention provides a stylus in which there are two said laminae each having a respective stylus point and each connected to a respective means for electrically energising the stylus, and mounted on a carrier body of insulating material. Such a stylus is particularly suitable for twin channel interlaced printing.

Preferably, the carrier body may comprise a disc having said stylus means formed as two conductive tracks, each disposed peripherally of a respective one of the faces of the disc. The means for electrically energising the tracks may then include slip rings arranged to contact the disc when the disc is installed in an electric discharge printing apparatus. The carrier disc more preferably has a recess, leaving a concave edge which intersects the circular edge of the carrier disc at said corner serving as the cutting tip.

Alternatively, the carrier may comprise a flexible insulating plate having separated electrically conductive stylus tracks thereon. Conveniently the tracks may be of carbon film deposited on the insulating material. However, any alternative conductive material may be used.

Reductions in the scanning time in electric discharge printing may be obtained by providing a multi-channel apparatus in which each channel includes a separate scanning head so that two or more separate interlaced scan lines can be traversed simultaneously, and in the case of the stencil cutter two nearby scan lines can be cut simultaneously on the stencil.

The invention provides, therefore multi-channel electric discharge printing apparatus comprising means for scanning at least two separate interlaced scan lines simultaneously, and means for discharge printing two corresponding interlaced scan lines simultaneously on a copy sheet wherein said means for discharge printing two interlaced scan lines include a stylus having two electrically conductive laminae mounted on an electrically insulating carrier and equipped with means for electrically energising the two laminae independently of one another in response to the operation of the scanning means on the respective scan lines on the original. For such multi-channel printing, use of a single, multi-tip stylus at the cutting head avoids the need for careful registration of the last line to be scanned by one head and the first line already scanned by the other head if the two heads were to have been widely spaced to scan separate non-interlaced areas of the original for simultaneous cutting of two corresponding separate areas of the stencil.

With a double-tip stylus it is possible to allow for replacement of one stylus by a fresh one, bearing in mind that the stylus does experience some degree of wear in use, without the need for careful realignment of the spacing between the two cutting heads if widely spaced styli were used.

The provision of a single light source for the two channels at the scanning head ensures that the controlling of brightness of illumination of the two points scanned can be assured with the absolute minimum of maintenance to the optics of the scanning system. Bearing in mind the close spacing of the scanning heads, it is particularly advantageous to incorporate fibre optics for receiving the light reflected from the respective scanned points and for relaying that light back to the respective phototransducers of the scanning channels.

A further possibility with the twin tip stylus is that the two scan lines can be positioned so close together that they allow a single optical system to carry the light reflected from the two simultaneously scanned points of the original. Thus a single light source will project light onto the entire scanned area and a single lens, with the aid of blanking discs will transmit the reflected light beams, with magnification, from the scanned points to associated photo diodes or other photoelectric transducers.

A further advantage of the provision of interlaced channels is that it is possible to operate on only one of the two channels, if required, and the pitch of traverse of the scanning and cutting heads will be virtually no greater than with interlaced multi-channel scanning, thereby enabling the "single-channel" or "multi-channel" scanning modes to be selected as alternative possibilities without any modification to the conventional traverse drive mechanism.

Preferably the interlacing is such that the scan lines which are scanned and cut simultaneously are contiguous scan lines of the original and copy. However, any other degree of interlacing, enabling closely located scanning heads and cutting heads is contemplated provided the separation between the scan lines being scanned simultaneously is an odd integral multiple of half the pitch of the scan lines on the image, or else the two scanning heads will at separate times scan the same lines of the image.

In addition to providing a more high speed process fot cutting stencils, this multi-channel electric discharge printing technique is advantageous in (a) facsimile equipment in that it may be used to speed up facsimile transmission where a facsimile is to be built up at a receiving station in response to an image scanned at a transmission station where the data transmission equipment has a limiting speed of data handling, and in (b) image processing where the limiting time factor is the rate of scanning of the image for converting image information into digital data and thus duplication of the conversion equipment with speed up the rate of conversion of image information by scanning two lines simultaneously.

In order that the present invention may more readily be understood the following description is given, merely by way of example, reference being made to the accompanying drawings in which.

Figure 1:
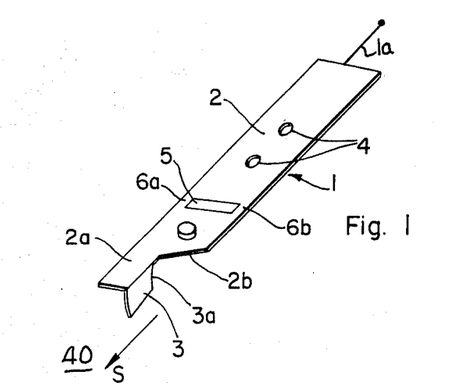
FIG. 1 is a perspective view showing a first form of stylus lamina complete with its integrally formed carrier body.

Referring now to the drawings, FIG. 1 shows the stylus generally designated at 1, as comprising a carrier plate 2 of stainless steel and having a bent over tab 3 at one end defining the stylus lamina.

In use, the stylus is electrically energized by clamping contact with the carrier plate 2. In FIG. 1, and also in FIG. 10, that energizing line is shown schematically as 1a.

The stylus carrier further includes a pair of holes 4 which serve for mounting the carrier plate 2 with respect to a stencil cutter in which the stylus cutter is to be used, and additionally there is a slot 5 extending transversely across the carrier body 2 so as to leave two narrow lateral regions 6a and 6b which act as leaf springs supporting the tip region 2a of the carrier plate and thereby mount the stylus lamina 3 resiliently with respect to the support to which the main portion of the carrier plate 2 is to be secured by means of the clamping holes 4. The regions 6a and 6b thus define the centre of movement of the stylus tip 3 during resilient flexure of the entire stylus 1.

The stylus 1 is formed in a single stamping operation which punches the mounting holes 4 and the slot 5 cuts a triangular notch defined between the oblique edge 2b of the carrier plate 2 and the rear edge 3a of the stylus lamina, and bends the tab forming the main stylus lamina 3 out of the plane of the carrier plate 2, in this case through 90°. The arrangement of the fold line, at which the stylus lamina 3 joins the tip portion 2a of the carrier plate 2, is such that the median plane of the stylus lamina 3 passes through the longitudinal median axis of the carrier plate 2, i.e. through the line which passes through the centre of the two holes 4 and the slot 5.

Figure 2:
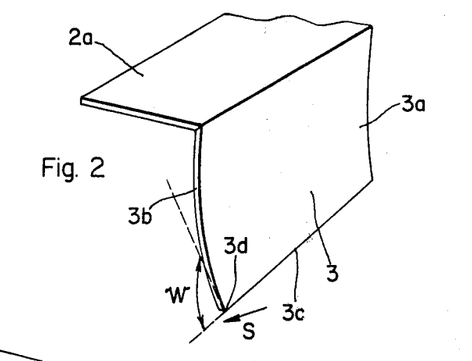
FIG. 2 is a detail of the stylus tip in FIG. 1.

FIG. 2 showing a detail of the stylus lamina of FIG. 1 shows that although the rear edge 3a of the stylus lamina is straight, the front edge 3b is curved so that an acute angle w remains between the edge 3b and the straight lower edge 3c at the stylus tip 3d.

At the corner defining the tip 3d the lower edge 3c is shallowly inclined with respect to the surface of the stencil-carrying drum and the other edge 3b is more steeply inclined.

The significance of the angle w will be explained later.

Figure 3:
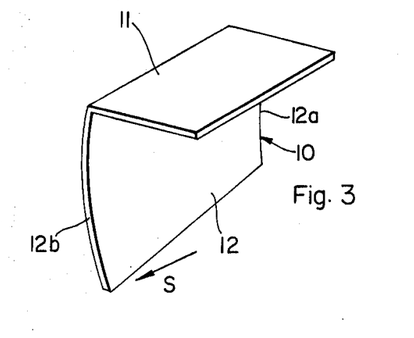
FIG. 3 is a perspective view of an alternative form of stylus in which the stylus tip is to be secured to a separately formed resilient carrier.

FIG. 3 shows an alternative form of the stylus in which a bent foil stylus generally designated 10 has an upper mounting portion 11 and a lower stylus lamina 12 having the same curved leading edge 12b and a straight trailing edge 12a as did the stylus lamina 3 of FIG. 2. The mounting portion 11 of the stylus 10 can be secured to a carrier (not shown) by any suitable means, for example by soldering.

Figure 4:
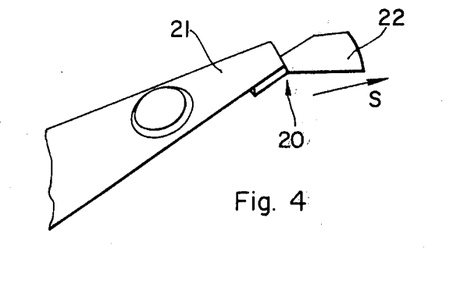
FIG. 4 is yet a further form of stylus showing a stylus lamina secured to its carrier.

FIG. 4 shows an alternative form of stylus, generally designated 20, as comprising a carrier 21 having a stylus lamina 22 carried at one end. The carrier 21 is similar to the stylus carrier of a conventional stencil duplicator and shows the simple modification necessary in order to replace the stylus wire of a conventional cutter by the stylus lamina 22 in accordance with the present invention.

The material chosen for the stylus lamina of FIGS. 1 to 4 may be of any suitable wear-resistant electrically conductive material, preferably with a high melting point, for example, carbon, tungsten, tantalum or molybdenum. These have better wear properties than aluminium and copper and their alloys, which in any case boil readily during arcing and are for these reasons preferred. Steel, copper and their alloys are easily workable and may therefore be attractive for more complex stylus forms, but would normally only be used for the mechanical support of a stylus tip of a higher melting point material such as nickel.

In the specific instances illustrated in FIGS. 1 to 4, the stylus lamina is of molybdenum foil having a thickness of $50\mu$.

Figure 5:
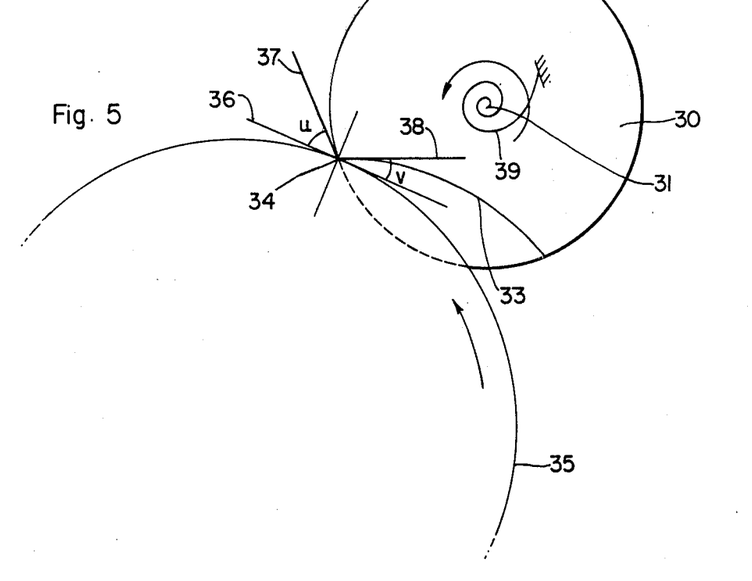
FIG. 5 is a side elevational view of an alternative form of stylus lamina in conjunction with the copy sheet carrying drum of the electric discharge printing apparatus, in this case a stencil cutter.

A completely different form of stylus lamina is shown in FIG. 5 as comprising a disc 30 mounted for rotation in the anti-clockwise sense about an axis 31 and having a generally circular periphery 32 broken only by a concave arcuate cut-away portion 33 joined at one end to the periphery 32 at a stylus tip 34. This tip 34 is adjacent to the surface of a stencil-support drum 35 which, in use of the stencil cutter, rotates to convey the stencil surface past the cutting tip 34 in the direction of the tangent 36 to the drum.

At the stylus tip 34, the tangent 37 to the circular periphery 32 of the stylus disc 30 makes an angle u with the tangent 36 whereas the tangent 38 to the arcuate cut-away 33 makes an angle v with the tangent 36. It will be seen that at the stylus tip 34, the angle at the tip (which angle was denoted w in FIG. 2) corresponds to the acute angle between the tangents 37 and 38 and would of course be greater than the angle u in FIG. 5.

Figure 6:
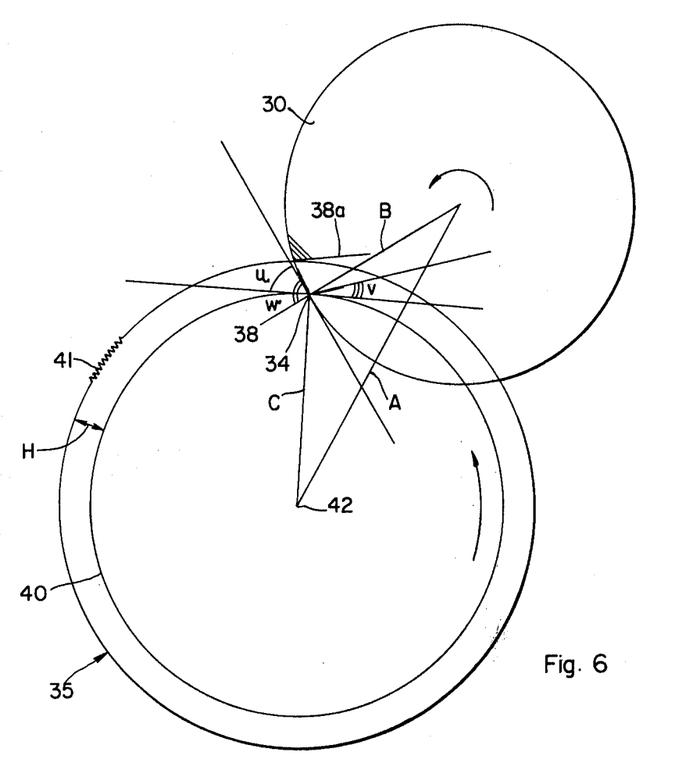
FIG. 6 is a schematic elevational view showing the geometry of the stylus of FIG. 5.

It has been found that the configuration of the tip 34, shown in more detail in the schematic illustration of FIG. 6, provides adequate cutting ability when used for spark discharge stencil cutting and this embodiment, moreover, has the advantage that it is self-compensating for wear as will now be explained.

A light torsion spring, in this case a clock-spring shown schematically at 39, biases the disc 30 for clockwise rotation so that when the tip 34 is eroded a fresh intersection (for example 34b in FIG. 7) between the circular periphery 32 and the now modified (by erosion) contour 33 of the cut-away can serve as the cutting tip.

Figure 7:
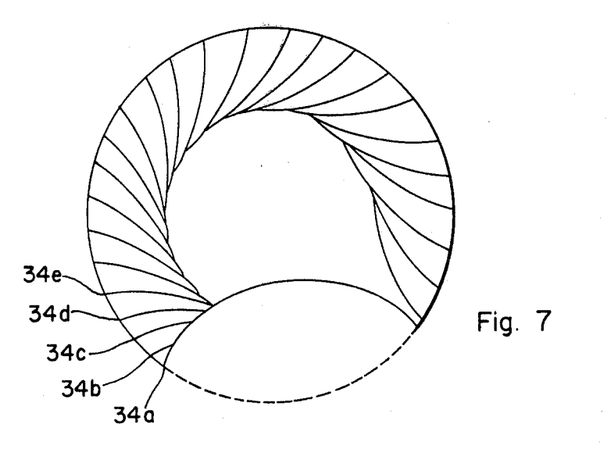
FIG. 7 is a schematic view, on an exaggerated scale, illustrating the effects of wear of the stylus due to abrasion by the emery strip customarily carried by the stencil-support drum.

FIG. 7 shows the effect of several incremental erosions of the stylus disc 30, caused by erosive wear, and indicates that the initial tip 34a has an acute angle between the tangents 37 and 38 which is less than the corresponding acute angle at the secondary tip 34b. However, the tertiary tip 34c and the successive tips 34d, 34e, etc. all have the same value as tip 34b for the angle within the tangents, although in this case the angle is a uniform obtuse value.

Referring now to FIG. 6, there is illustrated in detail the configuration of the stencil support drum 35. This drum has a cylindrical outer surface 40 on which a blank stencil is initially clamped for the purposes of cutting and, at a distance H above the stencil surface 40, the drum carries a strip 41 of emery paper which extends axially along the drum surface, and is usually carried by the clamp (not shown) which supports the top and bottom ends of the stencil. This strip 41 of emery strokes the stylus tip 34 once per revolution of the drum and serves to maintain the point of the stylus clean and sharp and to guard against the effects of random erosion due to the sparking action in use of the stylus.

For each revolution of the drum 35 the emery strip 41 will pass the stylus once and will deflect the tip of the stylus away from the drum surface 35 and abrade it slightly to maintain it clean. Whereas, hitherto, the abrading action on the stylus could continue for a limited number of stencils after which the stylus must be either re-aligned or even replaced, with the stylus disc 30 shown in FIG. 5 it is possible, by virtue of the indexing action caused by the clockspring 39 advancing the stylus tip 34 each time to present a clean, sharp point at the required location in relation to the surface of the stencil, to provide a self-renewing and re-setting stylus tip.

The stylus disc of FIG. 5 may either be a disc of conductive material, for example molybdenum foil of, say, $50\mu$ thickness, or alternatively it may be in the form of an insulating disc carrying a conductive track at its peripheral edge the conductive track defining part of the stylus electrode. In this latter case the disc may be of any suitable material, for example ceramic, and the track may, for example, be a carbon film track.

The mechanism by which the tip 34 remains ground at the appropriate angle is best illustrated in FIG. 6.

The emery strip 41 is, as explained above, disposed at a radial distance H above the stencil surface and thus, ignoring the thickness of the stencil to be clamped on the drum, the location at which the disc 30 is ground by the emery is a distance H further from the axis of rotation 42 of the drum 35 than is the location of the tip 34 during spark discharge cutting of the stencil.

The spring 39, shown in FIG. 5, will bias the stylus for anti-clockwise rotation once the emery strip 41 has passed, thus bringing the tip 34 back into its "stencil cutting" position to be lifted clear from that position and into the "stylus grinding" position the next time the emery strip 41 arrives back at the stylus tip.

Now, the tangent 38a to the arcuate recess portion 33 of the disc 30 (in the "stulus grinding" location) is also the tangent to the circular path of the emery strip 41. As soon as the stylus disc 30 rotates in the anti-clockwise sense down towards the surface of the stencil, the tangent 38a will also rotate in the anti-clockwise sense to the position shown by line 38 in FIG. 5 and this will, of course, leave an angle v between the tangent 36 to the surface 40 of the drum 35 and the tangent 38 to the recess 33.

Thus, with this circular stylus disc configuration, the rotary movement results in a free, well-defined cutting point at the stylus tip.

Figure 8:
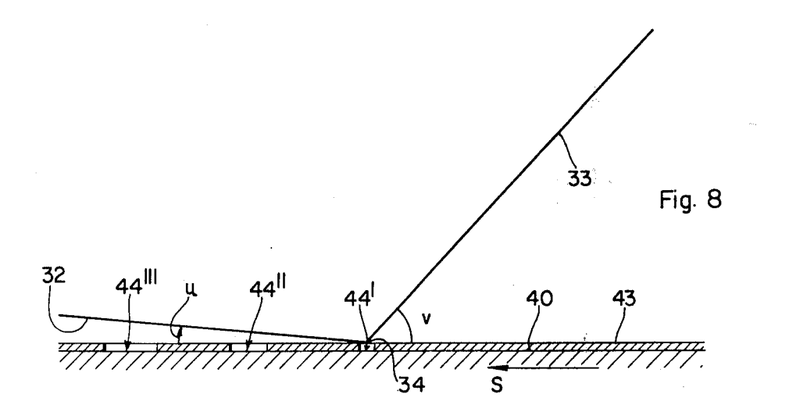
FIG. 8 is an exaggerated detail showing the geometrical configuration of the cutting tip of a typical stylus lamina.

Referring now to FIG. 8, there is shown in detail a side elevational view of the cutting tip 34.

In this exaggerated illustration, the drum surface is shown as planar rather than cylindrical (for the purposes of simplicity) and a value of u has been chosen which is of rather small magnitude, in order to illustrate the limiting case where the shallow angle of slope of the cylindrical portion 32 of the stylus disc relative to the stencil surface is such that the gap between an exposed part of the drum surface 40 under a hole 44″ or 44‴ previously formed is such that sparking may occur through that hole to widen the hole unduly. A certain amount of secondary erosion causing widening of the hole is desirable, but this must of course be kept within bounds.

As shown in FIG. 8 where the angle u is very small, the hole actually being cut by discharge at the stylus tip 34 is designated 44′, the last preceding hole in that scan line is designated 44″, and the hole 44‴ was that immediately preceding the hole 44″. As shown in FIG. 8, the hole diameter increases progressively from hole 44′ to hole 44‴. With a shallow angle of u between edge 32 and the surface of the stencil 43, if the breakdown potential of the stencil is relatively high, the desirable secondary erosion to widen the holes may undesirably result in the discharge from stylus tip 34 travelling along the surface of the stencil 43 and into hole 44″, rather than causing breakdown and spark discharge at the tip 34 needed to cut hole 44′. This gives an increased spacing between successive holes in the same scan line and is to be avoided as it will result in a deterioration in the vertical resolution of the stencil image. To overcome this possibility, the angle u must be made larger. This phenomenon is completely eliminated for values $u \geq 90°$.

In practice, when $u > 57°$ the increase in the diameter of the hole due to secondary erosion is less than 20% and when $u > 66°$ the increase in diameter is better than 10%. Preferably therefore, the angle $u > 55°$ for optimum results.

Since, at the right-hand side of FIG. 8, the stencil has no preformed holes directly below the edge 33 of the stylus there will be no tendency for stencil breakdown in advance of the stylus cutting tip 34 unless a particularly low breakdown voltage has been chosen for the stencil. Thus it is acceptable for the value of angle v to be relatively small, as is the case after secondary grinding of the tips 34b, 34c, 34d, 34e etc. in FIG. 7, while the angle u is of course important, although the value of angle u will be constant for all the tips 34a, 34b, 34c, 34d, 34e etc. of FIG. 7.

The same self-compensating abrading action of the stylus tip 3d will take place in the arrangement of FIGS. 1 to 3 although, since only a limited peripheral extent to the edge 12b is provided, the life of such a stylus will be less than that of the stylus shown in FIGS. 5 to 7. In FIGS. 1 to 4, the direction of travel of the stencil is shown by the arrow S.

The tab form of stylus shown in FIGS. 1 to 3, because of its simplicity, can be readily adapted for use in multi-channel electric discharge printing system such as an interlacing twin stylus cutting system.

The disc form of stylus illustrated in FIGS. 5 to 7 is particularly convenient for use with such a twin-stylus cutting system. In this interlaced image configuration, two separate circular electrically conductive foil laminae such as disc 30 in FIG. 5 will be mounted side-by-side and separated by an insulating washer which is calibrated in thickness according to the spacing required between the stylus tips, in use. The discs 30 will preferably be independently biased for indexing rotation by separate clocksprings 39 (or other resilient biasing means) so that each stylus is at the optimum position for compensating for previous abrasion effects.

Figure 9A:
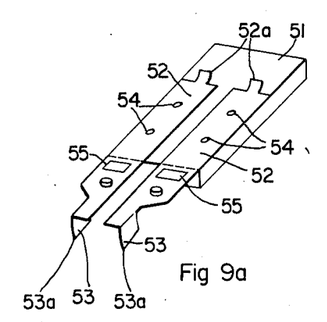
FIGS. 9a and 9b are perspective views showing two still further forms of twin channel stylus according to the invention.
Figure 9B:
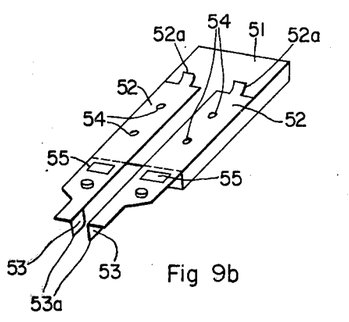

With the stylus of FIGS. 5 to 7, either in the single stylus mode or in the twin stylus mode just described above, there may be a locking system for temporarily holding the disc against the rotating action of the biasing means such as clockspring 39 so that the stylus mount can be pulled away from the drum surface to allow for removal of the stylus, without the stylus automatically indexing to a position in which, when the stylus is next dropped towards the drum 35, the cutting tip 34 will have moved right round to present a part of the circular periphery 32 to the stencil rather than the cutting tip 34 at the intersection between circular periphery 32 and concave arcuate periphery 33.

Where the twin stylus assembly is based on the tab form of stylus shown in FIGS. 2 and 3, the arrangement will be as shown in FIGS. 9a and 9b where two such tabs 53 are formed on but could alternatively be fixed to, a common resilient mounting plate 52.

Although FIGS. 9a and 9b show two distinct forms of twin channel tab stylus they each comprise two separate styli formed of spring steel strip and consisting of the main sheet 52 having at one end a tab 53 bent over at right angles along a fold line parallel to the major axis of the strip 52.

Each strip 52 has a pair of holes 54 to secure the stylus to an insulating carrier 51, and also a slot 55 extending transversely of the strip to render it more flexible. The corner 53a of each tab 53 defines the spark discharge tip of the stylus.

With the twin-tip stylus design as proposed above, the preferred materials for the insulating carrier 51 may include Kapton, ceramic materials, and epoxy resins. The preferred materials for the conductive stylus track or plate may be carbon, tungsten, molybdenum, graphite fibres or stainless steel. Other materials, apart from these preferred choices, are of course possible.

Clearly, a stylus such as that illustrated in FIGS. 9a or 9b can readily be removed from the machine and replaced by another stylus made under factory quality-controlled conditions so that there will be no need for alignment of the stylus to be set by the operator of the machine. This makes for much more rugged performance of the stencil cutter in the field where the operator would otherwise need special training on alignment of the stylus tips if there is not to be some much more complex self-adjusting facility.

Figure 10:
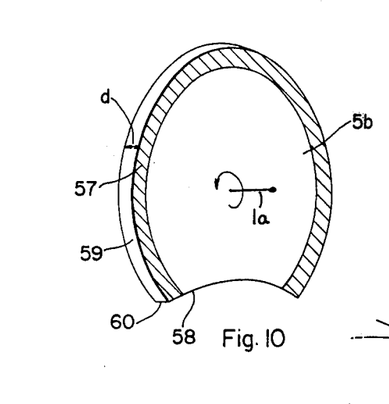
FIG. 10 is a perspective view of a twin-tip stylus in accordance with the invention for use with a twin channel stencil cutter.

FIG. 10 shows a perspective view of an alternative form of stylus in which the carrier consists in this case of a disc 56 of insulating material having two spaced electrically separate stylus tracks (only one, 57 of which is illustrated in FIG. 10) which are formed by depositing carbon film in an annular arrangement on each face of the carrier disc near the periphery. The thickness of the carrier disc will, in this case, be the dimension d, i.e.

the spacing between the two stylus tracks 57. This stylus configuration is shown in more detail in FIG. 11 where the stylus carrier is shown as having a concave segment cut away to leave a concave edge 58 which joints the periphery 59 of the disc at the cutting tip 60. The arrangement is to be such that the acute angle u defined between the tangent to the stencil and the tangent to the peripheral edge 59 of the carrier is to be as large as possible, while still leaving a value for the acute angle v between the tangent to the stencil and the tangent to the concave edge 58 of a low value which is not so low that secondary discharge occurs downstream of the tip 60. These two optimum values, namely the value for the angle u and the value for the angle v, are related to the ratio between the radii of the drum 40 and of the stylus carrier 56 so as to give adequate separation between the axis of rotation of the carrier 56 and the nearest point of the surface of the drum 40.

Figure 11:
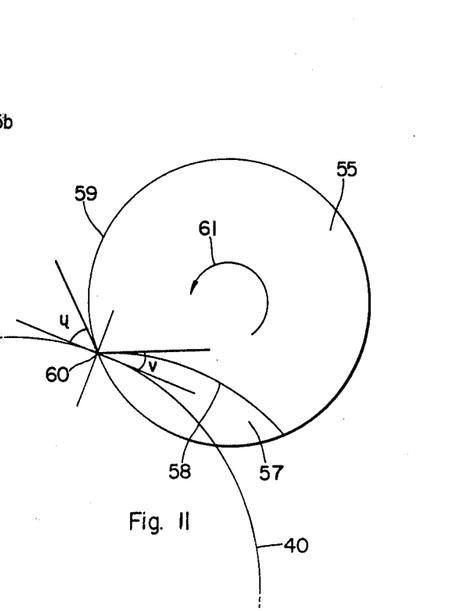
FIG. 11 is a side elevational view of the stylus of FIG. 10, when in use.

The carrier disc 56 may be biased for rotation in the direction illustrated by the arrow 61 in FIG. 11 so that as the cutting tip 60 becomes abraded by the narrow strip of emery paper conventionally arranged axially along the drum of the stencil cutter for the purposes of cleaning the stylus tip, the disc 61 will progressively rotate in the anti-clockwise sense so as to present a new part of the carrier disc and stylus tracks from which the spark is to be discharged. Alternatively the stylus disc 56 may be fixed in position in use of the cutter and rotated manually between stencil cutting operations.

The distance d, in this embodiment, may advantageously be 125 μm.

By way of example, the multi-channel electric discharge printing system of this invention will now be described in terms of a twin-channel stencil cutting apparatus.

Figure 12:
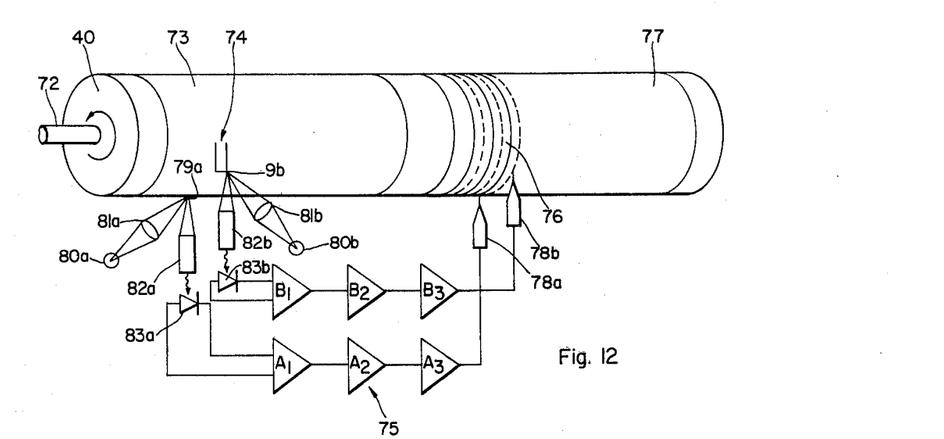
FIG. 12 is a schematic view of a rotating drum stencil cutter with twin scanning/cutting channels employing separate exciter lamps and separate cutting stylus tips and with the amplification circuitry shown in block diagram form.

In FIG. 12, a drum 40 mounted on a spindle 72 is rotatable in order to rotate an original 73 mounted on one end of the drum past a scanning station, generally indicated at 74, at which two separate points 79a and 79b are scanned for the image information to be transmitted by way of the twin-channel amplification circuitry, generally indicated at 75, to a stencil cutting station, generally indicated at 76. The cutting station is traversed axially with respect to the drum while in register with a stencil 77 carried on the end of the drum opposite that at which the image 73 is carried. The spacing, to be defined below, between cutting styli 78a, 78b at the cutting station 76 is equal to the spacing between the scanned points 79a and 79b at the scanning station 74.

As shown in FIG. 12 the scanned points 79a and 79b are displaced circumferentially of the drum 40 by a distance of 10 mm. although any other convenient value may be chosen for this spacing, while the axial spacing between the points 79a and 79b is 125 μm, although again any suitable axial spacing may be chosen.

The scanned point 79a is illuminated by light radiated from a source 80a and passing through a condenser lens 81a, while the scanned point 79b is illuminated by light from source 80b by way of condenser lens 81b.

The light reflected from scanned point 79a is transmitted by an optical system 82a to a photodiode 83a of the "A" channel while the "B" channel has corresponding optical system 82b and photodiode 83b.

Three stage amplification in each channel of the amplification circuitry, using amplifiers A1, A2, A3 and B1, B2, B3, respectively, provides a signal at the respective cutting stylus 78a and 78b which is responsive to the light incident on the respective photodiode 83a, 83b as a result of the illumination from light sources 80a and 80b. Clearly, for accurate stencil production, it is important that the light densities at the scanned points 79a and 79b should be equal and for this reason it may be advantageous to modify the system to use a single light source in place of the two light sources 80a and 80b, and a single condenser lens system in place of separate lenses 81a, 81b, and to position the scanning optics very close to one another, for example using optical fibres.

As is known in the field of stencil cutting, it is possible to have an adjustable threshold on the amplification circuitry to vary the density value of light incident on the photodiode 83a at the threshold between "non-image" and "image" signals which then anables sensitivity to be de-rated for scanning an original with a higher than usual degree of background which must not be reproduced on the stencil.

Also, it is possible for the axial dimension of the area of the original to be scanned, and consequently of the area of the stencil to be cut, to be adjusted in order that the cutting time can be reduced to a minimum by ensuring that the only area scanned is that on which image information appears (the blank margins being left unscanned.)

In the example shown in FIG. 12, the drum rotates at 600 rpm and the scanning pitch is 40 lines/cm. Thus, with an inter-channel spacing of 125 μm, the traverse rate of the scanning and cutting heads will be 250 μm/rev.

It is possible for the optical components 80a, 80b, 81a, 81b, 82a, 82b, the photodiodes 83a, 83b and the styli 78a, 78b to be carried on a common frame which traverses axially relative to the drum 12 by this preferred rate of 250 μm/rev. (on any other rate which may be required), for example by means of a mechanical traversing gear linking the scanning/cutting frame with the drum drive. Alternatively, the drum may traverse past a fixed frame on which the cutting and scanning equipment 78a–83a and 78b–83b are provided.

Figure 13:
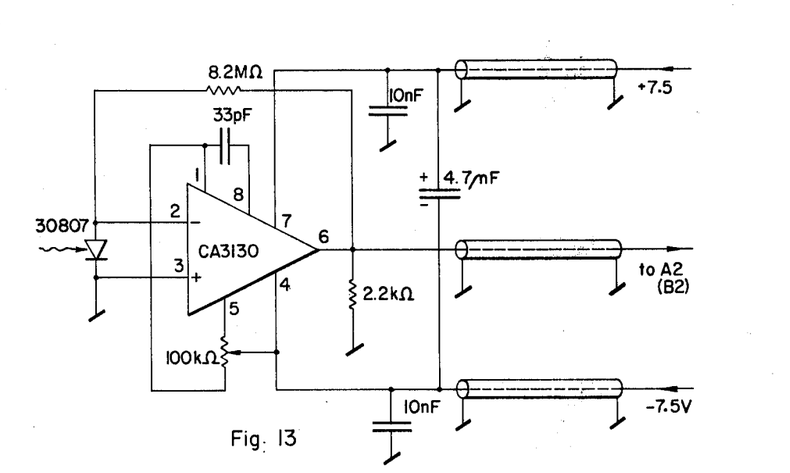
FIG. 13 is a circuit diagram showing the components of amplifiers A1 and B1.

Referring now to FIG. 13, there is shown the combination of the photodiode 83a and the first stage amplifier A1. The same component values apply for the diode 83b and amplifier B1. In this case, the photodiodes 83a and 83b are available from Radio Corporation of America under designation C 30807. The photo-amplifier used in the first stage amplifier A1 is again available from Radio Corporation of America, but under component designation CA 3130.

Figure 14:
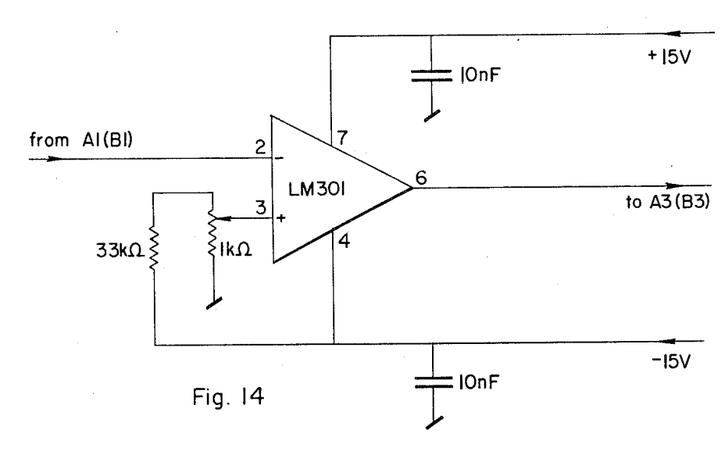
FIG. 14 is a circuit diagram showing the components of amplifiers A2 and B2.

As shown in FIG. 14, the threshold amplifier incorporated in the second stage amplifier A2 and B2 is available from National Semiconductors under component designation LM 301. As with FIG. 13, all the other component values shown on FIG. 14 apply equally to the second stage amplifier B2 of the "B" channel.

Figure 15:
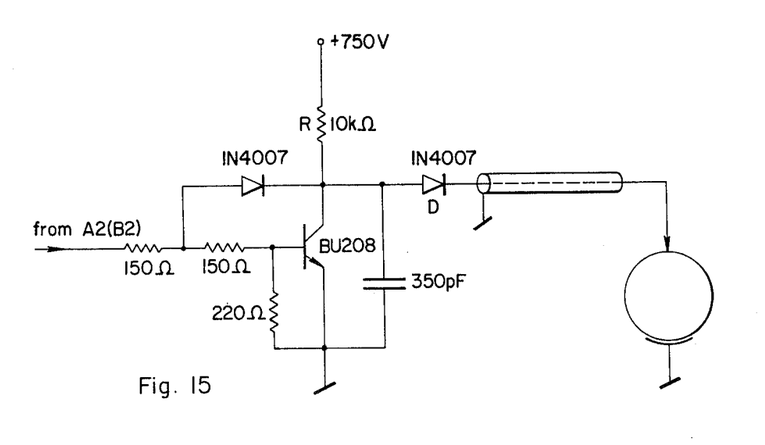
FIG. 15 is a circuit diagram showing the components of amplifiers A3 and B3.

Referring to FIG. 15, it will be seen that the third stage amplifier A3 or B3 has a transistor BU 208 available from Phillips Electrical Company incorporated in conjunction with other circuit components whose values are again common to the third stage amplifier B3 of the B channel.

In the arrangement illustrated in FIGS. 12 to 15, there is a deliberate peripheral spacing between the two scanned points 79a and 79b and the styli 78a and 78b in order to allow room for separate styli and separate scanning systems for evaluation purposes.

However, it is envisaged that the interlaced scanning configuration proposed in accordance with the present invention would be particularly useful when incorporated in a twin-tip cutting stylus to which separate cutting signals are supplied, one to each tip of the stylus, and in that case the two stylus tips can be very close together, just sufficiently widely spaced to allow the formation of distinct holes at each tip without interference between the two cut holes. For example, the axial spacing of 125 μm used in FIG. 12 can in practice also be used on such a twin-tip cutting stylus but without the need for the 10 mm. axial spacing.

As indicated briefly above, it is possible for the twin-channel scanning and cutting system of the present invention to be constructed in such a way that a single optical system can be used to transmit the twin light beams from scanned points 79a and 79b to the respective photo diodes 82a, 82b. In this arrangement it is necessary to provide a blanking plate having twin apertures, one for each optical channel, spaced by a distance less than the diameter of the lens, so that the light beams reflected from the respective scanned points 79a, 79b can pass through the lens, with magnification, and then through the apertures in the blanking plate to impinge ultimately on the phototransducer. As an example, the apertured blanking plate necessary with a pair of scanning channels having a spacing of 4 mm between the scanned points 79a, 79b and a diameter of scanned point equal to 60μ, would require two apertures each 120μ in diameter and spaced by a distance of 8 mm for use in conjunction with a lens having a 2× magnification. With photo diodes having cross-sections of the order of 4 to 5 mm, such an arrangement is readily possible since two 4 mm diameter diodes placed in contact side-by-side will present their centres at 4 mm spacing and thus, for convenience, opening up the spacing to 8 mm will allow separation between the two diodes.

This arrangement would readily be adaptable to the conventional 9 mm lens system used in currently available stencil scanners. The blanking plate to give these characteristics could either be a separate plate positioned facing the lens or a thin film deposited on one face of the lens.

If desired, a three channel scanning system may be incorporated in order to reduce scanning time still further.

In that case the stylus would include three adjacent corners, instead of the two corners described above for twin-channel use.

Where the dimensions of the phototransducer present limits which would otherwise preclude the use of a single optical system with two or more optical channels passing through it, it is possible for optical fibres to pick up the signal from closely spaced points in the optical system and to carry the light along divergent paths to more widely spaced photodiodes.

In order to effect electrical connection to the stylus, there are various possibilities which can be adopted. For example, in FIGS. 9a and 9b there are respective tabs 52a which serve to facilitate electrical energisation of the individual stylus plates 52, 53 which are of course themselves electrically conductive. The other twin-channel stylus, namely the conductive-tracked, insulating-disc stylus illustrated in FIG. 10, may be provided with slip rings, not shown, for the purposes of achieving electrical connection to the disc while still allowing it to rotate freely. Furthermore, the single channel stylus in FIGS. 1 to 4 may be energised by means of a simple electrical contact engaging either the stylus carrier plate 2 of FIGS. 1 to 3 or the stylus holder 21 of FIG. 4 at an end opposite that where the stylus tip occurs, in each case.

I claim:

1. An electric discharge printing device, including a movable support surface for a recording medium, and at least one stylus comprising: a conductive lamina arranged generally perpendicular to said support surface and generally parallel to the direction of movement of said support surface; first and second edges of said lamina defining a corner which is contiguous to said recording medium support surface and which, in use of the stylus, serves as the stylus tip; and connecting means for electrically energizing said lamina for electric discharge printing on the recording medium in use of the device, said first edge being shallowly inclined with respect to said support surface and said second edge being more steeply inclined with respect to said support surface.

2. A device according to claim 1, wherein said lamina is circular and including pivot means mounting said lamina for rotation about the centre of the circle of the lamina, means defining a concave peripheral recess to said circular lamina said corner defining the stylus tip being located where said concave peripheral recess joins the circular periphery of the lamina.

3. A device according to claim 2, including means biasing said circular lamina for rotation in one direction such that, when moving along said direction of rotation, said stylus tip lying between the generally circular peripheral edge and said peripheral recess moves away from the initial location of said generally circular peripheral edge of the lamina but towards the central location of said peripheral recess.

4. Electric discharge printing apparatus including a rotatable copy sheet support drum, and a device according to claim 2, mounted adjacent said copy sheet support drum, said axis of rotation of the stylus disc being parallel to but spaced from a generatrix of the surface of said copy sheet support drum.

5. A device according to claim 1, wherein said connecting means for electrically energizing said lamina is a resilient mount integrally formed with said lamina, and supporting said lamina in said electric discharge printing device to allow said corner serving as the cutting tip to be resiliently supported contiguous to the said support surface.

6. A device according to claim 5, wherein said resilient mount comprises a generally planar resilient support plate and the stylus lamina comprises a tab bent over at right angles to said generally planar resilient support plate.

7. A device according to claim 1, wherein said lamina is a conductive track formed on an insulating carrier.

8. A device according to claim 7, wherein said conductive track has been deposited on said insulating carrier by thin film deposition.

9. A device according to claim 1, wherein there are two said styli, each respective stylus having a respective lamina and stylus tip and each being connected to a respective means for electrically energizing said respective stylus; and including a common carrier body of insulating material which supports both said laminae and said energizing means.

10. A stylus according to claim 9, wherein said carrier body is a disc of insulating material having two opposed faces and having said laminae formed as two conductive tracks each formed on and disposed peripherally of a respective one of the faces of the disc.

11. A device according to claim 10, and including means defining a concave peripheral recess to said carrier disc which intersects the circular peripheral edge of the carrier disc at said corner serving as the cutting tip.

12. A device according to claim 10, wherein said tracks are of carbon film deposited on the insulating carrier.

* * * * *